United States Patent [19]
Young

[11] Patent Number: 5,864,856
[45] Date of Patent: Jan. 26, 1999

[54] PROCESS AND APPARATUS FOR SIMPLIFYING ACCESS TO INFORMATION STORED IN DATABASES

[75] Inventor: Carl Young, Acton, Mass.

[73] Assignee: Actuate Software, Inc., San Mateo, Calif.

[21] Appl. No.: 426,788

[22] Filed: Apr. 21, 1995

[51] Int. Cl.⁶ .................................................. G06F 17/30
[52] U.S. Cl. .................................. 707/100; 707/4; 707/7
[58] Field of Search ........................... 395/600; 364/513; 707/100, 4, 9

[56] References Cited

U.S. PATENT DOCUMENTS

| | | | |
|---|---|---|---|
| 4,866,634 | 9/1989 | Reboh et al. ............................ | 364/513 |
| 5,047,918 | 9/1991 | Schwartz et al. ....................... | 364/200 |
| 5,241,671 | 8/1993 | Reed et al. .............................. | 395/600 |
| 5,371,885 | 12/1994 | Letwin .................................... | 395/600 |

*Primary Examiner*—Thomas G. Black
*Assistant Examiner*—Cheryl Lewis
*Attorney, Agent, or Firm*—Mintz, Levin, Cohn, Ferris Glovsky and Popeo, P.C.

[57] ABSTRACT

Simplified access to relational databases is achieved. The inherent relationships that exist between tables in a relational database are detected and a dictionary is constructed that contains attributes that defines the relationships that exist within the database. The attributes of the database contained within the dictionary are mapped to objects of the database so that a user can navigate the database without using a database programming language using menus created from the dictionary.

33 Claims, 11 Drawing Sheets

| | | | | |
|---|---|---|---|---|
| Customer List | | | | |
| Customer | Corporation | Customer I.D. | Home Phone | Business Phone |
| David Cronin | Fenway | 14375 | 555-4321 | 555-4570 |
| Mary Smith | Acme | 32451 | 555-7240 | 555-6371 |

Fig. 11

PROCESS AND APPARATUS FOR SIMPLIFYING ACCESS TO INFORMATION STORED IN DATABASES

BACKGROUND OF THE INVENTION

1. Field of the Invention

This invention relates generally to the field of data information processing, and in particular to simplifying user access to information stored in relational databases.

2. Discussion of the Related Art

Relational databases are used in numerous applications to store a wide variety of data. Software applications are commercially available for creating relational databases and storing data therein. Examples of these software applications include products such as SYBASE SQL Server, Microsoft SQL Server, Oracle, and IBM DB2. While these products provide the capability to store data in various formats, they generally do not provide means by which a typical user of the database system can cross-reference information contained within separate catalogs or tables of the database. Cross-references between related tables are typically pre-programmed into the database by a system administrator or some other individual having knowledge of a programming language such as SQL.

Figure 1:
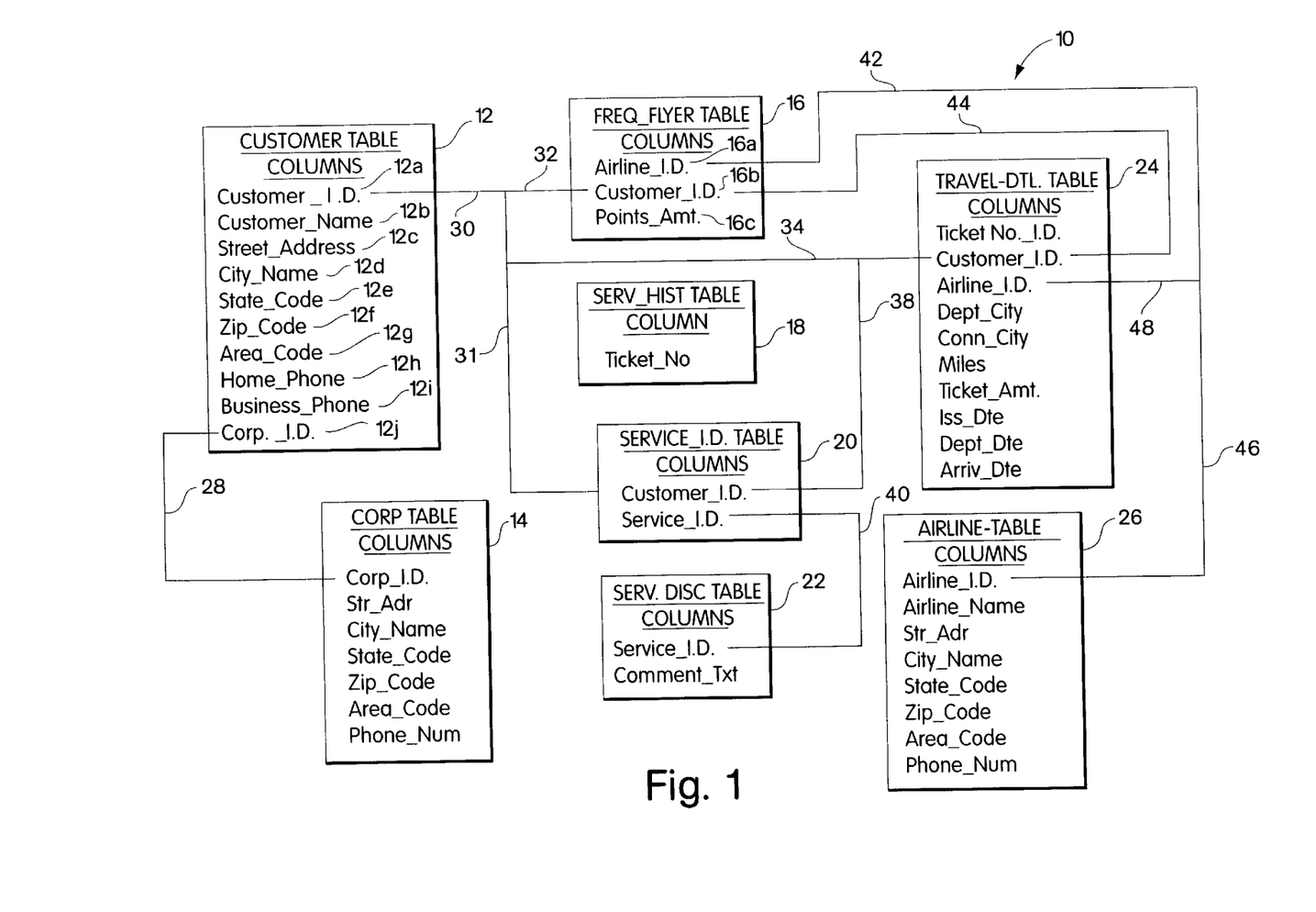
FIG. 1 shows tables within a database that may be used in conjunction with the present invention.

FIG. 1 shows an example of a data base 10 containing eight tables of information including a Customer table 12, a Corp table 14, a Freq_Flyer table 16, a Serv_Hist table 18, a Service_ID table 20, a Serv_Desc table 22, a Travel_Dtl table 24, and an Airline table 26. Each of the tables contain several columns of information. As an example, the Freq_Flyer Table 16 contains an Airline_I.D. column 16a, a Customer_I.D. column 16b, and a Points_Amt column 16c. Tables 12 through 26 are shown connected by interconnecting lines 28 through 48 each of which connect a column of a first table to a column of a second table having the same column name as the column of the first table. These interconnecting lines connect related tables and allow a user to easily access the information contained in a related table without making a new query into the database. For example, when a user is utilizing the Customer table 12, the user may wish to see additional information regarding a particular customer's company. If the cross-reference connection 28 exists, the user can directly access the information in the Corp table 14 from the Customer table 12 rather than exiting the Customer table and accessing the Corp table 14.

In the existing database management systems, the relationships shown in FIG. 1, are preprogrammed into the database by a system administrator using complex programming techniques and a programming language such as SQL. The system administrator when constructing a database will typically provide some relationships between related tables, but will not provide all of the relationships that inherently exist because of the programming time required for accomplishing this and because the system administrator may not be aware of all of the relationships that exist between tables in the database. Additional problems and limitations are created for the user when the system administrator is not familiar with the needs of the user, and therefore, not familiar with which relationships the user would find most useful. When a user of the database management system requires additional joining of the tables in the database, beyond that which is originally programmed by the system administrator, a request must be made to the system administrator or some other individual familiar with the programming language of the database to provide the system with this capability. Additional programming must then be performed to provide the user with the requested capability.

Graphical interface programs for accessing databases are commercially availabe, however, these programs require that a system administrator define the relationships that exist in the database as discussed above. An example of a database graphical interface program is FindOut! Analyst from Open Data Corporation, Lexington, Mass. Findout! Analyst allows a user to navigate a database to find information quickly, however, it requires that a dictionary exist that defines the relationships in the database. In the prior art systems, this dictionary must be generated manually by a system administrator as described above.

SUMMARY OF THE INVENTION

Embodiments of the present invention provide a process and an apparatus for simplifying a user's access to the information contained within a relational database by enabling the user to interactively navigate the database taking advantage of the relationships that inherently exist between tables in the database. These capabilities are provided without the need for extensive programming by a system administrator. By providing these capabilities, embodiments of the present invention overcome the shortfalls discussed above.

One embodiment of the present invention is directed to a data processing apparatus for accessing the information contained within a relational database. The apparatus includes a central processing unit that interacts with the database, a user interface, and a memory containing a dictionary builder. The dictionary builder is comprised of modules that scan selected portions of the database, and construct a dictionary of the database. The dictionary contains classes and attributes that define the relationships that exist between the tables contained in the database.

In another embodiment of the present invention, the dictionary builder includes a user interface and customization module that allows a user of the data processing system to edit the dictionary to customize the dictionary to the user's needs.

In yet another embodiment of the present invention, the dictionary builder includes a mapping module that maps classes and attributes of the dictionary to the tables and columns of the database to allow access to the object values contained within the database.

In still another embodiment of the present invention, the dictionary builder includes a form and menu construction module that provides the user with standard forms for accessing information in the database.

The present invention is also directed to a method for simplifying access to information contained within a relational database. The method includes steps of characterizing the database to determine the relationships that exist among the tables contained within the database, and constructing a dictionary containing attributes that define the relationships discovered during the characterization step.

In another embodiment of the method of the present invention, the method includes an additional step of customizing the dictionary based upon selections made by a user.

In yet another embodiment of the method of the present invention, the method includes an additional step of mapping the attributes contained within the dictionary to the database.

BRIEF DESCRIPTION OF THE DRAWINGS

Other features and advantages of the present invention shall appear from the following description of an exemplary embodiment, said description being made with reference to the appended drawings, in which.

DETAILED DESCRIPTION

Figure 2:
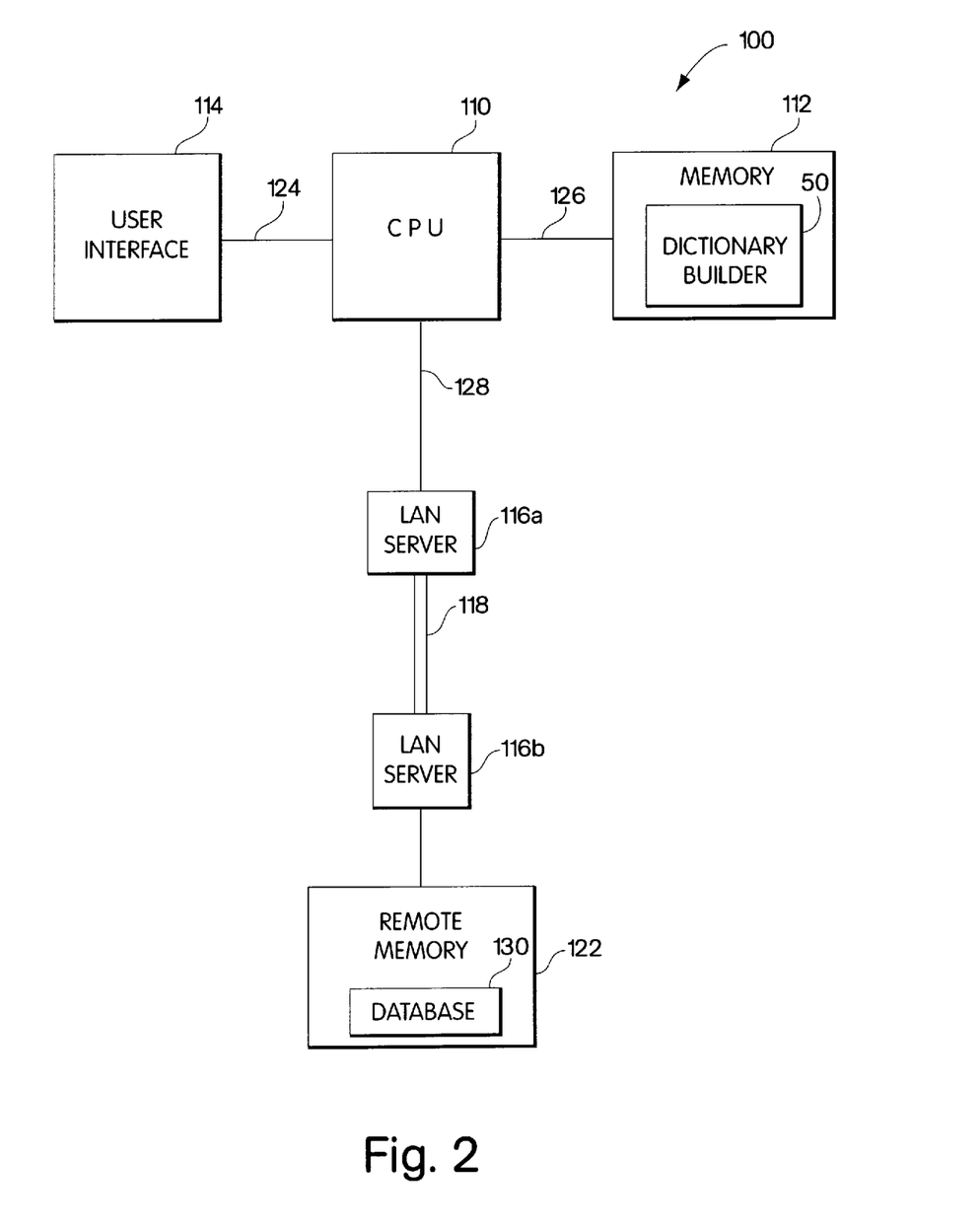
FIG. 2 shows a block diagram of an embodiment of the invention.

A detailed description of embodiments of the present invention will now be described in connection with FIGS. 1–8. Similar reference numbers in the drawings indicate similar structures. A data processing system comprising one embodiment of the invention is shown in FIG. 2. FIG. 2 shows a Central Processing Unit (CPU) 110 which typically includes a microprocessor and control logic. The CPU 110 may be a 486 personal computer having at least 12 megabytes of Random Access Memory (RAM) using the DOS operating system, version 5.0 or higher, and Windows version 3.1 or higher. Alternatively, the operating system for the personal computer may be the IBM OS/2 operating system, version 2.1 or higher. Connected to the CPU 110 is a user interface 114. The user interface 114 is coupled to the CPU 110 via a user interface bus 124. The user interface 114 may be a computer display, keyboard, and mouse. The user interface 114 is typically a physical entity by which the user inputs commands to and receives information from the CPU 110. The user interface 114 may also include a touch screen, a joystick, a track ball, a touch pad, or a similar device. Normally, a display represents the primary output of CPU 110, but printed media and electronic output may also be used. A memory 112 is also coupled to the CPU 110 through a memory bus 126. The memory 112, as well as the remote memory 122, may be a hard drive, floppy disk, electronic memory such as a random access memory (RAM), erasable programmable read only memory (EPROM), electrically erasable programmable read only memory (EEPROM), magnetic, optical, or magneto-optical recording media, tapes, or other non-volatile linear access media or a combination of these. The CPU 110 is also coupled to a LAN server 116a through a LAN interface bus 128. The LAN server 116a is coupled to a second LAN server 116b through a LAN 118. The LAN server 116b is coupled to a remote memory 122 through a LAN interface bus 120. Through the LAN 118, the CPU 110 is able to access the remote memory 122. The remote memory 122 contains at least one database 130 in which information is stored in catalogs, each of which contains one or more tables of information. Alternately, the database may be contained in memory 112 or in an additional memory coupled to the CPU 110.

Memory 112 contains a dictionary builder 50 having program modules for providing the CPU 110 with instructions for enabling a user, through the user interface 114, to access information contained in the database 130. The dictionary builder 50 may also reside in the remote memory 122, or in an additional memory coupled to the CPU 110.

Figure 3:
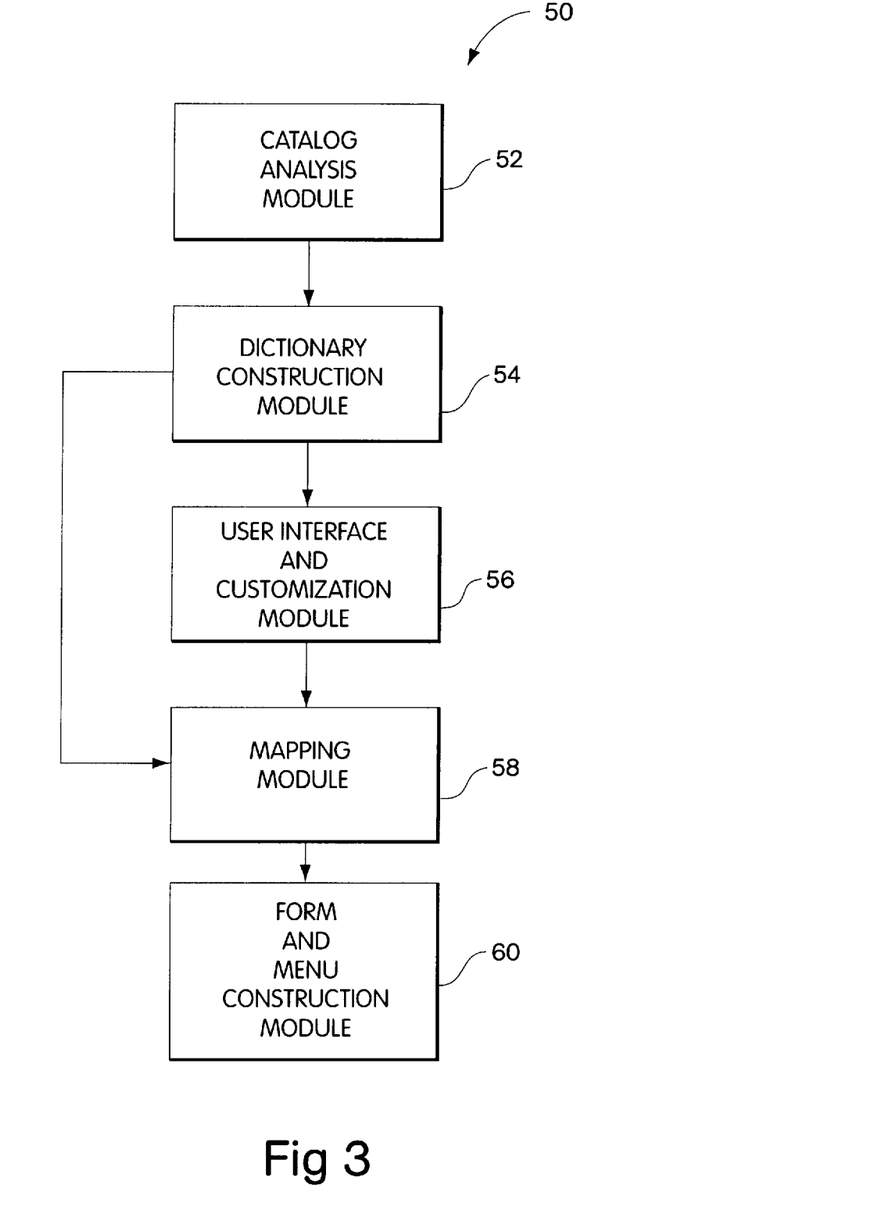
FIG. 3 shows a block diagram of a dictionary builder according to an embodiment of the invention.
Figure 4:
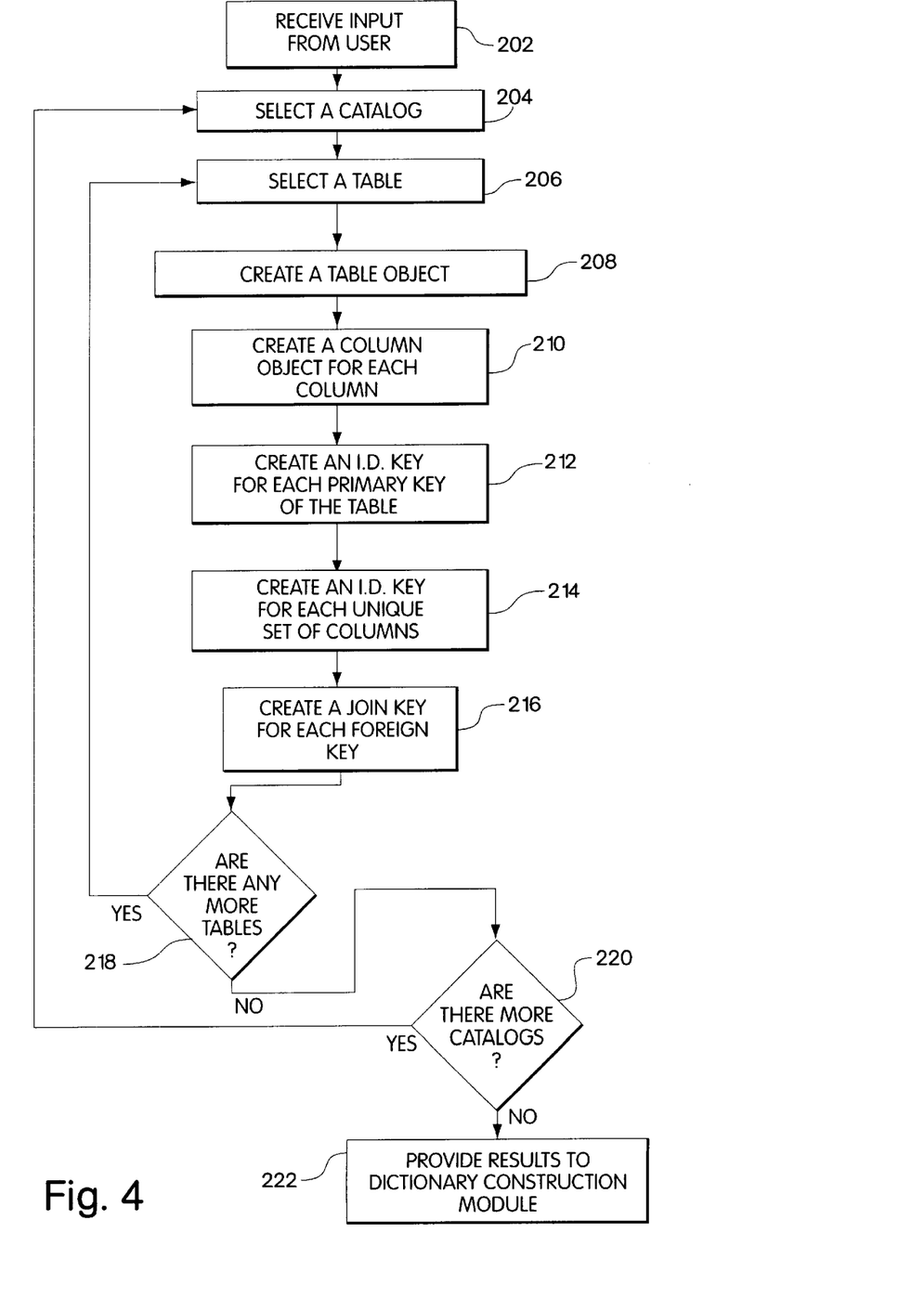
FIG. 4 shows the process by which the catalog analysis module scans the database in one embodiment of the invention.

The dictionary builder 50 is comprised of five interconnected modules as shown in FIG. 3. A catalog analysis module 52 is connected to a dictionary construction module 54 which is connected to both a mapping module 58 and the user interface and customization module 56. The mapping module 58 is connected to both the user interface and customization module 56 and the form and menu construction module 60. The function of each of these modules is described below.

The catalog analysis module 52 analyzes the information contained within the database and provides the dictionary construction module 54 with the results of the analysis. The steps conducted in performing this analysis will be described with reference to FIG. 4. Initially, in step 202, the catalog analysis module receives information from a user through the user interface 114. The information received from the user defines the schema of the dictionary and includes which database and which catalogs and tables within the database are to be analyzed by the catalog analysis module. The information contained within a database is typically organized in one or more catalogs containing one or more tables. In steps 204 and 206, one of the specified catalogs and one of the tables within the catalog are selected. In steps 208 through 216, the catalog analysis module creates a table object for the table, creates a column object for each column contained in the table, creates an I.D. key for each primary key of the table, and also creates an I.D. key for each unique set of columns of the table, and creates a join key for each foreign key of the table. The objects and I.D. keys created in steps 208 through 216 are identifiers of the items contained within the schema that are later used by the dictionary builder module to define the contents of the schema. As indicated in steps 218 and 220, the catalog analysis module repeats steps 208 through 216 for each table of each catalog selected in step 202.

In order to better understand the terms used in the functional description of the catalog analysis module, reference is made to FIG. 1. FIG. 1 shows eight sample tables 12–26 from a sample database 10. Using the Customer table 12 as an example, the catalog analysis module creates a table object for the table and creates a column object for each of the columns 12a through 12j. The catalog analysis module creates an I.D. key for the primary key of the table. In table 12, the Customer I.D. is defined as the primary key of the table by the database and will become the I.D. key for this table in the dictionary. The catalog analysis module also creates an I.D. key for each set of columns indicated as a unique set by the database. For example, the Home_Phone column 12h of the Customer table 12 is also a unique column, assuming that no two customers have the same home phone number. For each foreign key in the table, the catalog analysis module creates a join key. A foreign key indicates that another table exists which is related to the table containing the foreign key. Customer table 12 has a foreign key indicating that the Corp_I.D. Column 12j is related to Corp table 14. The catalog analysis module will create a join key corresponding to this foreign key.

Figure 5:
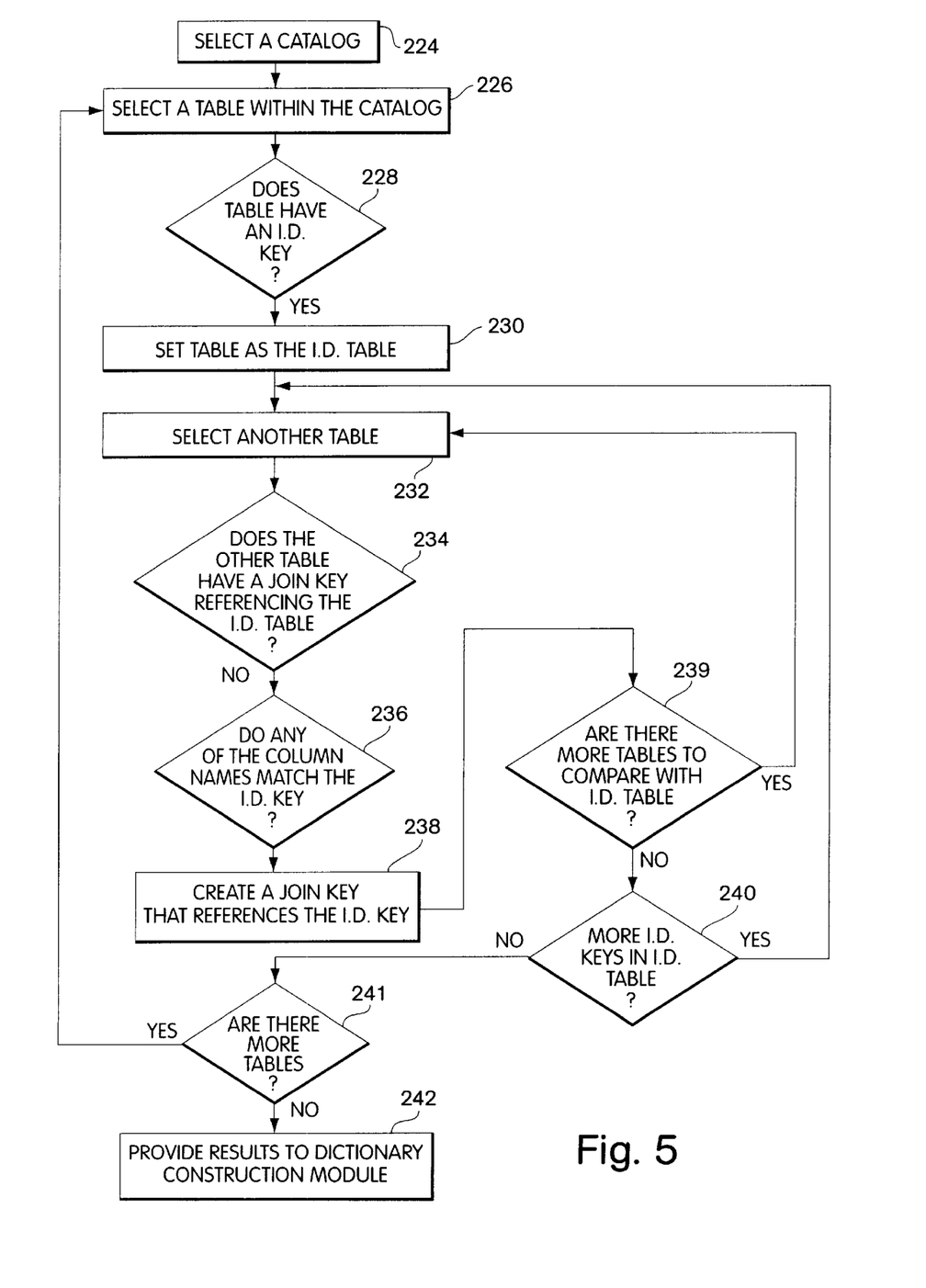
FIG. 5 shows the process by which the catalog analysis module scans the database in another embodiment of the invention.

After completing the initial scan of the database, the catalog analysis module, depending on a selection made by the user, may perform a second scan of the database further analyzing the contents of the database to see if additional join keys may be created. As shown in FIG. 5 in steps 224 through 242, the catalog analysis module examines each table that has an I.D. key for each catalog within the schema defined by the user and compares the table with each other table to determine if the other table has a join key referencing the I.D. key, and if not, it compares each of the columns of the other table with columns of the I.D. key of the table. If every column of the I.D. key has a corresponding column in the other table with the same name and data type, a join key is created in the other table that references the I.D. key. The catalog analysis module repeats this procedure for each of the tables contained within the schema.

The function of the dictionary construction module will now be explained with reference to FIG. 6. The dictionary construction module 54 in FIG. 3 constructs a dictionary of the data contained within the schema defined by the user based upon the analysis results received from the catalog analysis module according to the procedures set forth in FIG. 5. First, as shown in steps 302–306 in FIG. 5, the dictionary construction module identifies each table that is a source table for a class. A source table is defined as a table that has an I.D. key and is not a pure join table. A pure join table is a table in which all of the columns are members of one or more join keys. Referring to FIG. 1, the Service_I.D. table 20 is a pure join table. For each of the source tables identified, the dictionary construction module creates a class name in step 308. The table is defined as the source table for the class.

The dictionary construction module in step 308 creates two class names for each class by converting the table name to a name that is easier for the end user to recognize, and by creating a plural form of the name. The class name is created from the table name by using the following four rules:

1) Table names that contain a lower-case letter, followed by an upper-case letter have a space inserted between the letters creating two separate words. As an example, a table having a table name of "ServiceDescription" will have a class name of "Service Description".

2) Underscore characters in a title of a table are converted to spaces. For example, referring to FIG. 1, the name of the Travel_Dtl table 24 will be converted to "Travel Dtl".

3) Individual words are converted to mixed case by forcing the first character of the word to upper-case, and the subsequent characters to lower-case.

4) The characters "i.d.," if they exist as a separate word, are converted to upper-case.

After the class name is created, a plural from of the name is created by using the following five rules:

1) Locate the last letter of the name, and if the name has more than one letter, the next to last letter.

2) If the last letter of the name is "s", add the suffix "es".

3) If the last letter in the name is "y" and the next to last letter in the name is a vowel, add the suffix "s".

4) If the last letter is "y" and the next to last letter is not a vowel, remove the "y" and add the suffix "ies".

5) If the last letter is neither "s" nor "y", add the suffix "s".

Figure 6:
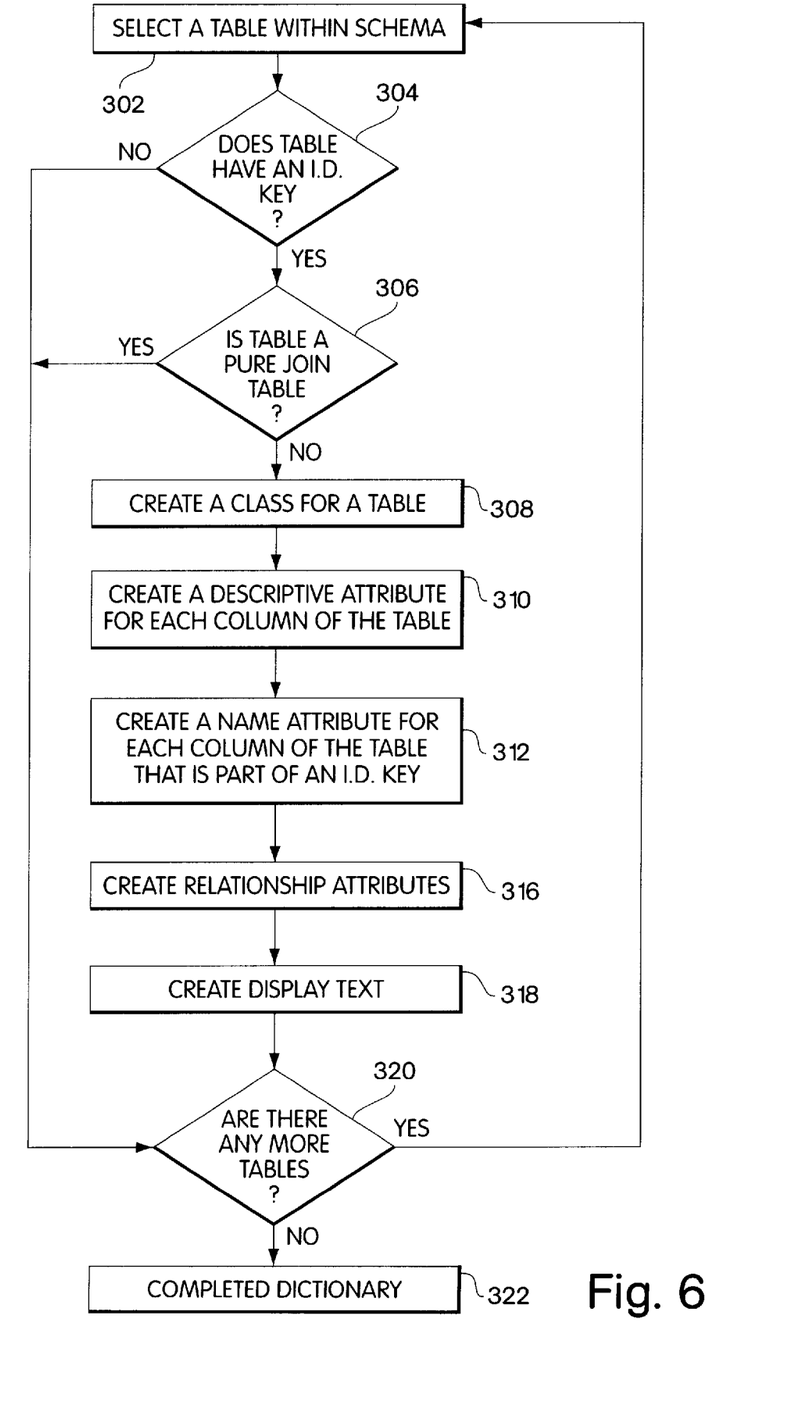
FIG. 6 shows the process by which the dictionary construction module constructs the dictionary according to one embodiment of the invention.

After creating the class names for a table in step 308, the dictionary construction module creates descriptive attributes for each column of the table, and a name attribute is created for each column of the table that is part of an I.D. key as shown in steps 310 and 312 in FIG. 6. The process for generating the descriptive attributes and the name attributes is substantially the same as that described above for the class name.

As shown in step 314 of FIG. 6, the dictionary construction module next creates relationship attributes from the join keys of the table. The process by which the dictionary construction module creates relationship attributes is described with reference to FIG. 7. For each join key of a source table, the dictionary construction module determines whether the join key is joining individual items, an individual item and a list, or a first list and a second list. Based upon these distinctions, the dictionary construction module will create either item attributes or list attributes in either the source table, the detail table or both. This is accomplished as shown in steps 324 to 336 of FIG. 7.

Figure 7:
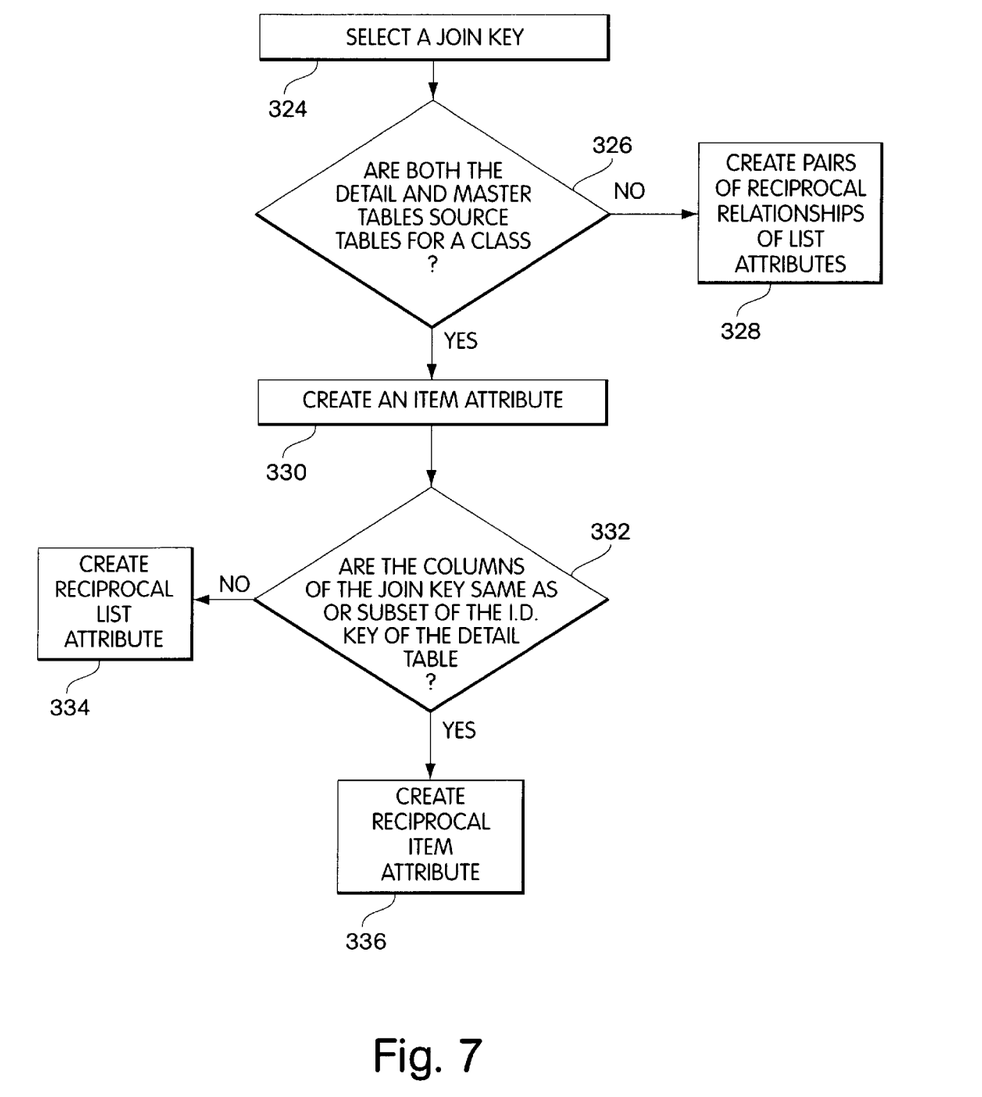
FIG. 7 shows the process by which the dictionary construction module creates relationship attributes according to one embodiment of the invention.

Three examples from FIG. 1 will be used in conjunction with FIG. 7 to describe how the dictionary construction module creates the list and item attributes. The Travel_Dtl table 24 from FIG. 1 will be used in the first example. A table containing a join key is defined as the detail table of the join key, and the corresponding table having the I.D. key to which the join key refers is defined as the master table for that join key. As previously discussed, a source table is defined as a table that has at least one I.D. key and is not a pure join table. The Travel_Dtl table 24 is a source table for the Travel Dtl class and it contains a join key for connecting the Travel_Dtl table 24 with the Customer table 12 as shown by the interconnecting lines 30 and 34. The Customer table is the master table for this join key and the Travel_Dtl table is the detail table.

The particular join key described above will now be used to follow the steps shown in FIG. 7. In step 324 the join key of the Travel_Dtl table was selected. The corresponding master table, the Customer table, is a source table for a class and the Travel_Dtl table is also a source table for a class. Therefore, the result of step 326 of FIG. 7 will be "Yes", and an item attribute will be created in step 330 such that the Travel_Dtl table is the source table of the local class of the item and the Customer table is the source table of the content class of the item. The result of step 332 will be "No" since the join key column, Customer I.D., is not an I.D. key of the Travel_Dtl table. The Customer I.D. column does not have a unique set of values in the Travel_Dtl table. Each of the customers may have purchased more than one ticket and have traveled more than one time. In step 334, a reciprocal list attribute will be created such that the Customer table is the source table for the local class of the list and the Travel_Dtl table is the source table of the content class of the list.

The Freq_Flyer table 16 will be used in the second example to describe the process used by the dictionary construction module in FIG. 7. The Freq_Flyer table has a join key connecting the Freq_Flyer table with the Customer table 12 as indicated by connecting lines 30 and 32. This is the join key selected in step 324 of FIG. 7. The corresponding master table, the Customer table, for this join key is a source table for a class, and the Freq_Flyer table is also a source table, so the result of decision step 326 will be "Yes". An item attribute will be created in step 330 such that the Freq_Flyer table is the source table for the local class of the item and the Customer table is the source table for the content class of the item. The result of decision step 332 will also be "Yes" since the column of the join key is an I.D. key of the Freq_Flyer class. Therefore, an item attribute will be created in step 336 such that the Customer table is the source table for the local class of the item and the Frequent Flyer table is the source table of the content class of the item.

The Service_I.D. table 20, and the join key corresponding to the Customer table, indicated by connecting lines 30 and 31, are used in the third example to describe the process of FIG. 7. The Service_I.D. table is not a source table for a class, and therefore, the result of step 326 will be "No". All of the columns of the Service I.D. table are join keys, and therefore, the Service I.D. table is acting as a pure join table. In step 328, the dictionary construction module will create pairs of reciprocal relationships between the local class generated by the Customer table and the local classes generated by the Travel_Dtl table and the Serv_Desc table. Each side of the reciprocal is a list attribute whose local class has one of the master tables as its source table and whose content class has the other master table as its source.

After the list and item attributes have been created, the dictionary construction module creates display text for each of the classes. This is shown as step 318 in FIG. 6. The display text is the text that is shown to the user whenever an element of the class is viewed on a form. When an element of a class is viewed, the display text is filled in by replacing an attribute name with the attribute value for that element. For example, if the display text for the customer class is "\:last name:\,\:first name:\\:middle initial:\.", then when the object that represents the customer named Pete Jones is displayed, the displayed text will be equal to "Jones, Peter P.". Note that the names and initials are the values of the attributes. An important step within the creation of the displayed text is replacing name attributes with item attributes. This is done so that when an item attribute is used in the displayed text, it is the displayed text of the items content class that is substituted for the item attribute name. This leads to very readable and meaningful displays for the user. As an example, an item attribute corresponding to customer was created in the Frequent Flyers class during the creation of item attributes described above. In the displayed text, rather than displaying the item attribute name, customers, it is the actual customer name that will be displayed. Once the displayed text is created, the dictionary construction module provides the user interface customization module with the contents of a newly created dictionary.

The user interface and customization module 56 utilizes standard graphical user interface (GUI) techniques such as those known in a windows environment to allow a user to edit the dictionary created by the dictionary construction module. This allows the user to customize the dictionary created by the dictionary construction module. The user accesses the user interface and customization module through the user interface and the CPU.

The function of the mapping module 58 will now be described. Referring to FIG. 3, the mapping module 58 receives the dictionary created by the dictionary construction module 54 and any user modifications to the dictionary from the user interface and customization module 56. The mapping module 58 connects the classes and attributes of the dictionary to the tables and columns in the database so that the proper commands can be generated to retrieve the object values in the database. The connection of the dictionary to the database is accomplished by assigning a map index and a map column for each descriptive, name, and relationship attribute in the dictionary as shown in steps 410 through 462 in FIG. 8. The map columns and the map index can then be used to generate the appropriate commands, using for example SQL, to provide the necessary connections between the database and the dictionary. The appropriate SQL commands may be generated from the results of the mapping module using a tool such as FindOut! Analyst available from Open Data Corporation, Lexington Mass.

The process by which the map index and the map columns are determined are described below with reference to FIG. 8. A different mapping procedure is used depending on whether the attribute to be mapped is an item attribute, a list attribute, name attribute or a descriptive attribute. Each of these procedures is described below.

Figure 8:
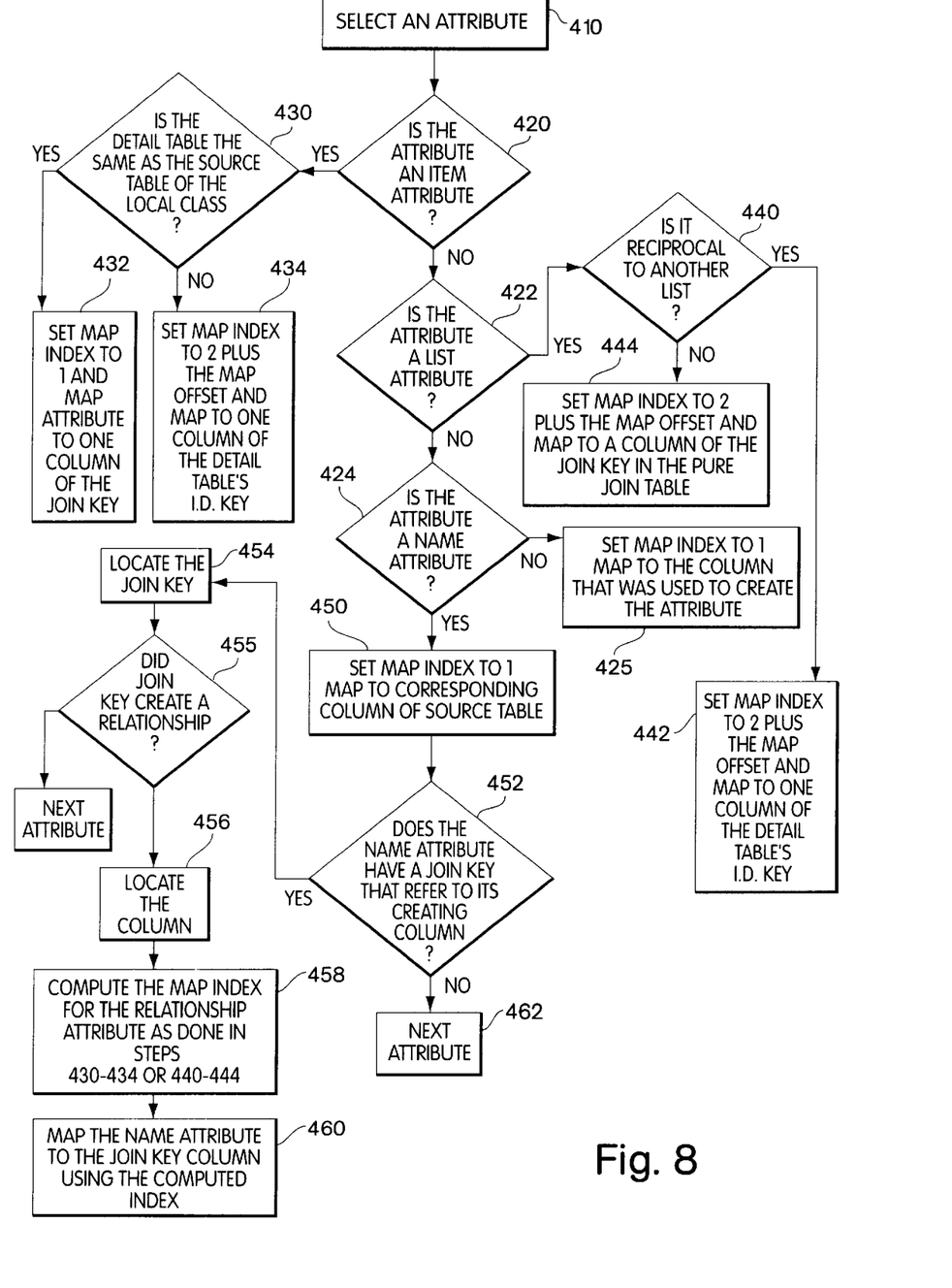
FIG. 8 shows the process by which the mapping module maps the attributes of the dictionary to the database according to one embodiment of the invention.

One of the attributes to be mapped is selected in step 410 of FIG. 8. In step 420, it is determined whether the selected attribute is an item attribute. The procedure for mapping an item attribute is shown in steps 430 through 434 of FIG. 8. In step 430, the mapping module determines whether the detail table is the same as the source table for the item's local class. If the result of step 430 is "Yes", then, in step 432, the mapping module sets the map index to 1 for this item attribute and maps the item attribute to one column of the join key of the detail table. If the result of step 430 is "No", then in step 434, the mapping module sets the map index to 2 plus the map offset, and maps the item attribute to one column of the detail table's I.D. key. The map offset of a given attribute is computed by counting the preceding relationship attributes on the same local class that have the same content class as the given attribute, discarding self-referencing items. A self-referencing item is an item whose content class is the same as its source class.

The procedure for mapping a list attribute is shown in steps 440 through 444. In step 440, the mapping module first determines whether the list attribute is reciprocal to a list or to an item. If the result of step 440 is "Yes", indicating that the reciprocal attribute is an item, then the mapping module sets the map index to 2 plus the map offset, and maps the list attribute to one column of the detail table's I.D. key. If the result of step 440 is "No", indicating that the reciprocal attribute is a list attribute, then in step 444, the mapping module sets the map index to 2 plus the map offset, and maps the column to a column of the join key in the pure join table, such that the master table of the join key is the source table for the content class of the list.

The procedure used by the mapping module to map a name attribute is shown in steps 450 through 460 of FIG. 8. The mapping module in step 450 sets the map index to 1 and maps the name attribute to the corresponding column of the source table from which the name attribute was created. Additionally, the mapping module, in step 452 determines whether any join keys refer to the corresponding creating column of the name attribute. If the result of step 452 is "No", then the mapping module selects another attribute and repeats steps 410 through 460 until all of the attributes have been mapped. If the result of step 452 is "Yes", then in step 454, the mapping module locates the join key. In step 455, the join key is examined to see if it generates a relationship. If the result of step 455 is "Yes", then in step 456, the mapping module locates the column of the join key that refers to the creating column of the name attribute. The mapping module then computes the map index for the relationship attribute corresponding to the join key as is done in steps 430 through 434 or in steps 440 through 444. The name attribute is then mapped to the join key column determined in step 456 using the map index computed in step 458.

In step 424, if the attribute is not a name attribute, then it must be a descriptive attribute. The procedure for mapping a descriptive attribute is outlined in step 425. The map index is set to 1 and the descriptive attribute is mapped to the column that was used to create the descriptive attribute. The results of the map index are saved in the memory with the dictionary builder.

Figure 9:
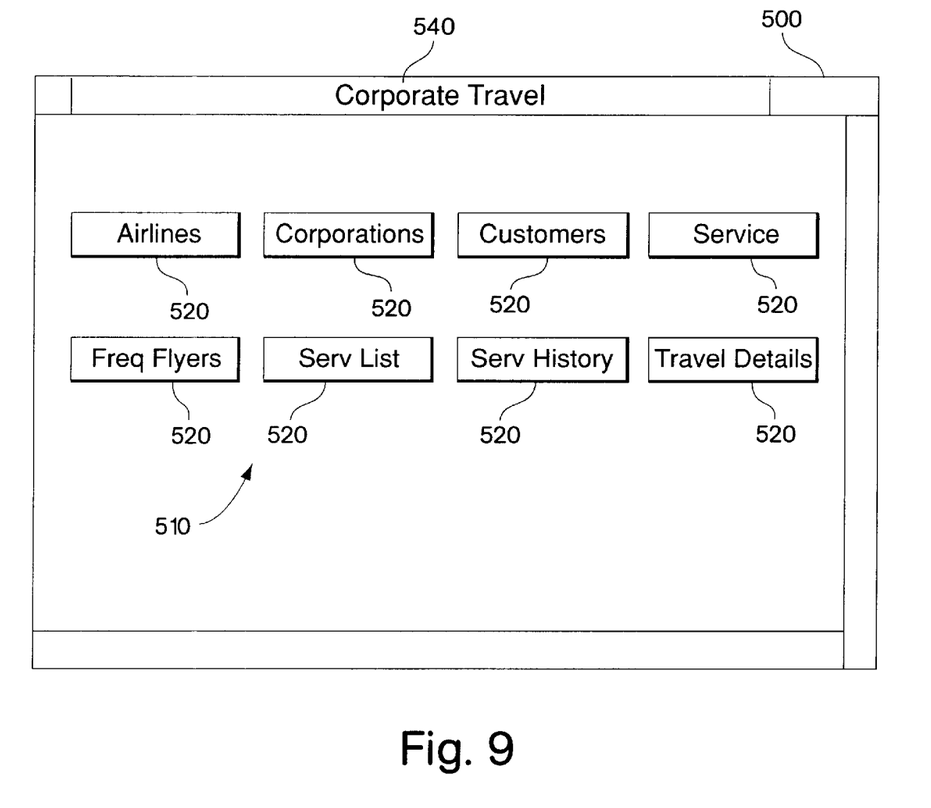
FIG. 9 shows an example of a main menu generated by one embodiment of the invention.

The function of the form and menu construction module 60 will now be described. The form and menu construction module constructs the shell of an application for a user by constructing a collection of forms. These forms can be used by a user in generating reports and for searching the database using a program such as FindOut! Analyst. Several different types of forms can be developed depending on the needs of a particular user. A main menu is one example of a form that can be created. The main menu may provide a button field for every class that is contained in the dictionary, so that the user can select a particular class by selecting the button corresponding to the class. An example of a main menu corresponding to the example of FIG. 1 is shown in FIG. 9. The main menu 500 contains a button field 510 containing a button 520 for each table from FIG. 1. The menu also contains a title 540 which may be defined by the user.

Figure 10:
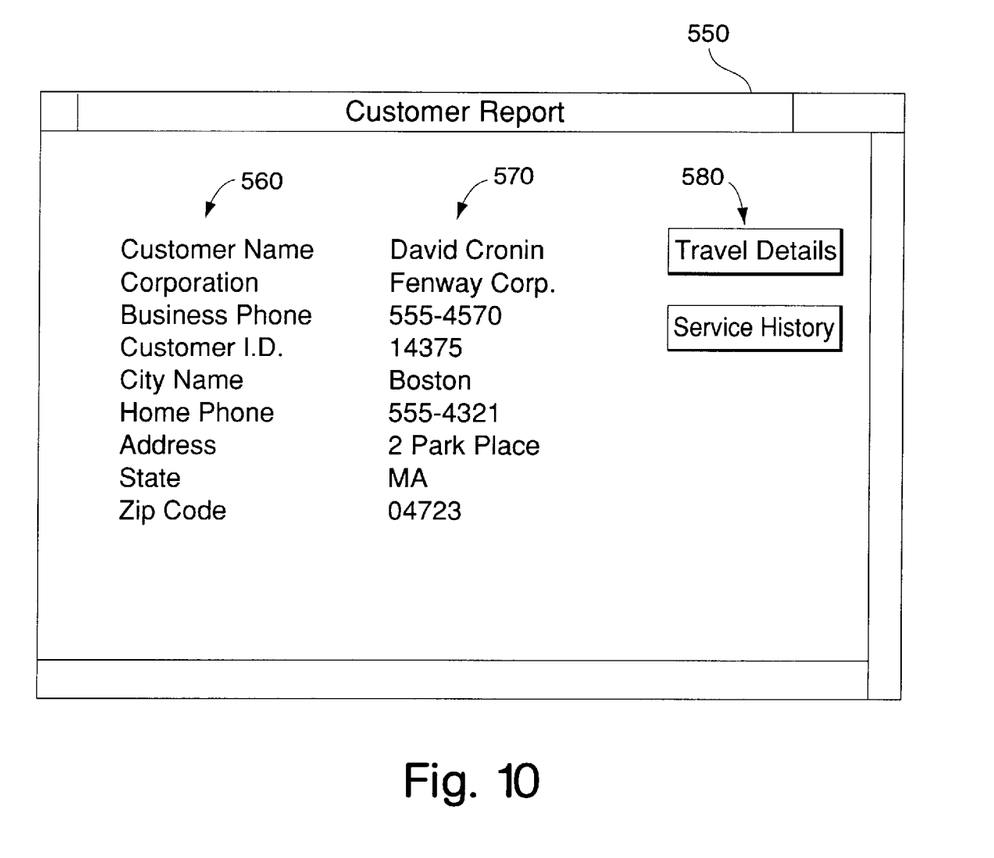
FIG. 10 shows an example of a basic form generated by one embodiment of the invention.

Other forms may be created including a basic form having three columns. The first two columns display the names and values of non-list attributes of a class. The third column shows a button for every list attribute. An example of a basic form 550 for the customer class is shown in FIG. 10. The form 550 includes a first column 560 that lists the attribute names, a second column 570 that lists the attribute values, and a third column 580 containing buttons for the list attributes.

Figure 11:
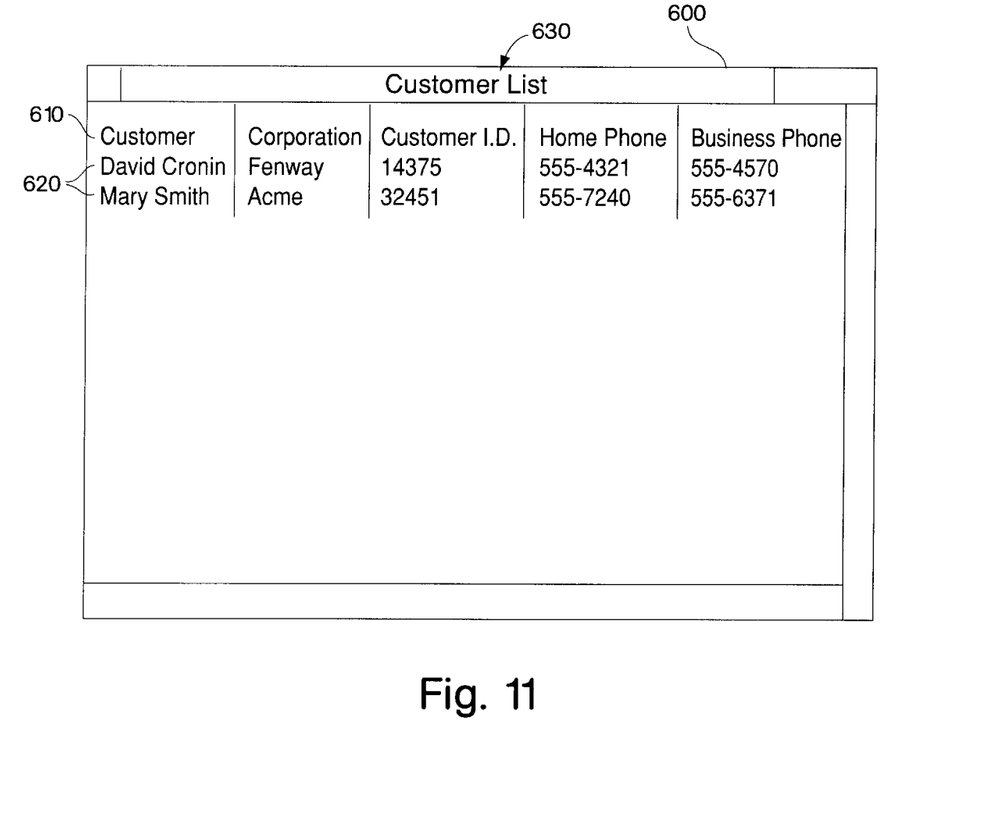
FIG. 11 shows an example of a list form generated by one embodiment of the invention.

Another form that may be created is a list form that provides a user with a list of the attributes of a class along with the corresponding values of the attributes. FIG. 11 shows an example of a list form 600. The form includes a title 630, a row of attributes 610, and two rows of values 620 of the attributes. It is envisioned that other forms and menus could be created by the form and menu construction module in addition to the examples provided above.

Several implementations of the invention are envisioned. The above description has focused on an embodiment of the invention in which the modules comprising the dictionary builder are contained in a memory coupled to a CPU. Further implementations of the invention may include software structure residing on a general purpose computer or a standalone personal computer. Also special purpose hardware may be dedicated to performing the functions of the dictionary modules discussed above.

Having thus described particular embodiments of the invention, various alterations, modifications, and improvements will readily occur to those skilled in the art. Such alterations, modifications and improvements are intended to be within the spirit and scope of the invention. Accordingly, the foregoing description is by way of example only, and not intended to be limiting. The invention is limited only as defined in the following claims and the equivalents thereto.

What is claimed is:

1. A data processing system for accessing a database comprising:
   a central processing unit;
   a user interface coupled to the central processing unit; and
   a dictionary builder, coupled to the central processing unit, that scans the database, creates a dictionary containing attributes that define relationships between tables in the database, and couples the dictionary to the database;
   wherein the tables include columns having column names, and wherein the dictionary builder includes a catalog analysis module that selects a table within the database, creates an ID key for each set of one or more columns in the table identified as a unique set, and creates a join key, referencing the selected table, in any other tables in the database having a set of columns with column names that match the column names of a set of columns of an ID key.

2. The data processing system of claim 1, wherein the dictionary builder includes a user customization module that interacts with the user interface to allow a user of the data processing system to view and edit the dictionary.

3. The data processing system of claim 2, wherein the dictionary builder includes a mapping module that creates a map index and a map column for each attribute contained in the dictionary.

4. The data processing system of claim 1, wherein the dictionary builder includes a user customization module that interacts with the user interface to allow a user of the data processing system to view and edit the dictionary.

5. The data processing system of claim 1, wherein the dictionary builder includes a mapping module that creates a map index and a map column for each attribute contained in the dictionary.

6. The data processing system of claim 1, further comprising a dictionary construction module that generates one of an item attribute and a list attribute for each join key created by the catalog analysis module.

7. The data processing system of claim 6, further comprising a mapping module that creates a map index and a map column for each item attribute and for each list attribute generated by the dictionary construction module.

8. A data processing system for accessing information contained within a database comprising:
   means for scanning the information contained within the database;
   means for creating a dictionary containing attributes that define relationships between tables in the database; and
   means for coupling the dictionary to the database.

9. The data processing system of claim 8, wherein the information in the database is arranged in tables having columns with column names, and wherein the means for scanning includes:
   means for selecting a table;
   means for creating an ID key for each set of one or more columns of the selected table identified as a unique set; and
   means for creating a join key, referencing the selected table, in any other tables within the database having a set of columns with column names that match the column names of columns of a set of columns corresponding to an ID key of the selected table.

10. The data processing system of claim 9, further comprising user interaction means for allowing a user of the data processing system to view and edit the dictionary.

11. The data processing system of claim 10, wherein the means for coupling includes means for mapping each attribute contained in the dictionary to an object of the database.

12. The data processing system of claim 11, further comprising means for building forms and menus from information contained in the dictionary.

13. The data processing system of claim 9, further comprising means for generating one of an item attribute and a list attribute for each join key created by the catalog analysis module.

14. The data processing system of claim 13, further comprising means for mapping each item attribute and each list attribute to an object of the database.

15. The data processing system of claim 8, further comprising user interaction means for allowing a user of the data processing system to view and edit the dictionary.

16. The data processing system of claim 8, wherein the means for coupling includes means for mapping each attribute contained in the dictionary to an object of the database.

17. The data processing system of claim 8, further comprising means for building forms and menus from information contained in the dictionary.

18. A method for accessing information contained within a database comprising the steps of:

scanning the information contained within the database;

creating a dictionary containing attributes that define relationships between tables in the database; and coupling the dictionary to the database.

19. The method of claim 18, wherein the information in the database is arranged in tables having columns with column names, the method further comprising the steps of:

selecting a table;

creating an ID key for each set of one or more columns of the selected table identified as a unique set; and creating a join key, referencing the selected table, in any other tables within the database having a set of columns with column names that match the column names of a set of columns corresponding to an ID key of the selected table.

20. The method of claim 19, further comprising the step of editing the dictionary.

21. The method of claim 20, further comprising the step of mapping each attribute contained in the dictionary to an object of the database.

22. The method of claim 21, further comprising a step of creating forms and menus from information contained within the dictionary.

23. The method of claim 19, further comprising a step of generating one of an item attribute and a list attribute for each join key.

24. The method of claim 23, further comprising a step of mapping each item attribute and each list attribute to an object of the database.

25. The method of claim 18, further comprising the step of editing the dictionary.

26. The method of claim 18, further comprising the step of mapping each attribute contained in the dictionary to an object of the database.

27. The method of claim 18, further comprising a step of creating forms and menus from information contained within the dictionary.

28. A dictionary builder for building a dictionary of, and connecting the dictionary to, a database having information arranged in tables, each of the tables having at least one column with a column name, the dictionary builder comprising:

a catalog analysis module that analyzes the information contained within the database and generates analysis results;

a dictionary construction module, coupled to the catalog analysis module, that generates the dictionary of the information contained in the database based on the analysis results created by the catalog analysis module; and a mapping module, coupled to the dictionary construction module, that maps information contained in the dictionary to the database.

29. The dictionary builder of claim 28, wherein the catalog analysis module selects a table within the database, creates an ID key for each set of one or more columns in the table identified as a unique set, and creates a join key, referencing the selected table, in any other tables in the database having a set of columns with column names that match the column names of a set of columns of an ID key.

30. The dictionary builder of claim 29, wherein the dictionary construction module generates one of an item attribute and a list attribute for each join key created by the catalog analysis module.

31. The dictionary builder of claim 30, further comprising:

a user customization module that interacts with a user interface coupled to the database to allow viewing and editing of the dictionary.

32. The dictionary builder of claim 30, wherein the mapping module creates a map index and a map column for each item attribute and list attribute generated by the dictionary construction module.

33. The dictionary builder of claim 30, further comprising a form and menu module that creates forms and menus from information contained in the dictionary.

* * * * *